(12) United States Patent
Lin et al.

(10) Patent No.: US 12,480,816 B2
(45) Date of Patent: Nov. 25, 2025

(54) OPTICAL MEASUREMENT APPARATUS, OPTICAL MEASUREMENT ADAPTER AND METHOD OF OPTICAL MEASUREMENT

(71) Applicant: AmTRAN Technology Co., Ltd., New Taipei (TW)

(72) Inventors: Hsiao I Lin, New Taipei (TW); Chao-Ching Chen, New Taipei (TW); Yi Hsueh Lin, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 175 days.

(21) Appl. No.: 18/585,009

(22) Filed: Feb. 22, 2024

(65) Prior Publication Data

US 2024/0353261 A1    Oct. 24, 2024

(30) Foreign Application Priority Data

Apr. 20, 2023    (TW) .................................. 112114849

(51) Int. Cl.
  *G01J 3/50*    (2006.01)
(52) U.S. Cl.
  CPC ..................................... *G01J 3/506* (2013.01)
(58) Field of Classification Search
  CPC ...... G01J 3/0202; G01J 3/0267; G01J 3/0289; G01J 3/0291; G01J 3/50; G01J 3/506
  See application file for complete search history.

(56) References Cited

U.S. PATENT DOCUMENTS

| 2003/0071998 A1* | 4/2003 | Krupka ..................... G01J 3/50 356/402 |
|---|---|---|
| 2005/0122518 A1 | 6/2005 | Overbeck et al. |
| 2014/0091210 A1 | 4/2014 | Hogo et al. |
| 2016/0377483 A1 | 12/2016 | Oh et al. |

FOREIGN PATENT DOCUMENTS

| CN | 114199380 A | 3/2022 | |
|---|---|---|---|
| CN | 114739639 A | 7/2022 | |
| DE | 102009021220 A1 * | 11/2010 | ........... G01N 21/474 |
| TW | 200734613 A | 9/2007 | |
| TW | 201104236 A | 2/2011 | |

* cited by examiner

*Primary Examiner* — Hina F Ayub
(74) *Attorney, Agent, or Firm* — CKC & Partners Co., LLC (57) ABSTRACT

An optical measurement apparatus includes a color analyzing device and an abutting member. The color analyzing device includes a light collecting portion, a body and a connecting portion. The light collecting portion is configured to face to a device under test (DUT) and collect a light emitted from the DUT. The body is configured to measure and analyze the light. The connecting portion connects between the body and the light collecting portion along an axis. The abutting member is tubular and extends along the axis. The abutting member has a first rim and a second rim opposite to the first rim along the axis. The connecting portion penetrates through the first rim and connects with an inner wall of the abutting member. The second rim defines a first abutting surface inclined by a measurement angle relative to the axis and configured to abut against the DUT.

18 Claims, 8 Drawing Sheets

OPTICAL MEASUREMENT APPARATUS, OPTICAL MEASUREMENT ADAPTER AND METHOD OF OPTICAL MEASUREMENT

RELATED APPLICATIONS

Technical Field

This application claims priority to Taiwanese Application Serial Number 112114849 filed Apr. 20, 2023, which is herein incorporated by reference.

BACKGROUND

Technical Field

The present disclosure relates to optical measurement apparatus, optical measurement adapters and method of applying these optical measurement apparatus and optical measurement adapters. More particularly, the present disclosure relates to optical measurement apparatus, optical measurement adapters and method thereof applied to measure display screens.

Description of Related Art

Traditionally, the optical data of a display device under test is measured by a fixing-type color meter. The color meter is usually fixed at an angle facing perpendicularly to the display device for measurement. Since the display panels of display products on the market are becoming bigger and the consumer demand for wide viewing angle display is increasing, the measurements for optical data of display products nowadays are required to perform at different viewing angles on various screen regions. The current measuring process usually fixes the display device or the color meter on a robot arm, and a preset program controls the automatic measurement and rotation, which allows the color meter to face a specific display region on the display screen at a specific angle. However, the robot arm occupies a considerable amount of space. Moreover, the color meter is susceptible to ambient light or reflected light, and the steps of measuring a certain display region at certain viewing angle cannot be quickly adjusted since the program controlling the measurement steps needs to be re-configured accordingly. Therefore, there is an urgent need for measuring equipment which allows optical measurement of display device to be more convenient and accurate, and at the same time the costs to perform such measurement can be reduced.

SUMMARY

A technical aspect of the present disclosure is to provide an optical measurement apparatus, which can collect light emitted from a screen in a certain measurement angle in a simple and easy manner for subsequent analysis.

According to an embodiment of the present disclosure, an optical measurement apparatus includes a color analyzing device and an abutting member. The color analyzing device includes a light collecting portion, a device body and a connecting portion. The light collecting portion is configured to face to a device under test (DUT) and collect a light emitted from the DUT. The device body is configured to measure and analyze the light. The connecting portion is connected between the device body and the light collecting portion along an axial line. The abutting member is in a tubular shape and extends along the axial line. The abutting member has a first rim and a second rim opposite to the first rim along the axial line. The connecting portion at least partially penetrates through the first rim and connects with an inner wall of the abutting member. The second rim defines a first abutting surface. The first abutting surface is inclined by a measurement angle relative to the axial line and is configured to abut against the DUT.

In one or more embodiments of the present disclosure, a range of the measurement angle is between 5 degrees and 60 degrees.

In one or more embodiments of the present disclosure, the first abutting surface is a flat surface. The abutting member is configured to be rotatable relative to the connecting portion. The first rim at least partially abuts against the device body.

In one or more embodiments of the present disclosure, the abutting member includes a main body and a plurality of pads. The main body is in a tubular shape and extends along the axial line. The main body has the first rim and the second rim. The pads are respectively connected at an inner wall of the main body. The pads are configured to surround and connect with the connecting portion.

In one or more embodiments of the present disclosure, a material of the main body is polyvinylchloride (PVC).

In one or more embodiments of the present disclosure, the main body is manufactured from a 3-directional (3D) printer.

In one or more embodiments of the present disclosure, the abutting member includes a main body and a light-absorbing layer. The main body is in a tubular shape and extends along the axial line. The main body has the first rim and the second rim. The light-absorbing layer is coated on an inner wall of the main body.

In one or more embodiments of the present disclosure, the abutting member has a first reference point and a second reference point opposite to the first reference point. The first reference point and the second reference point are respectively located at the second rim and arranged at the measurement angle relative to the axial line. The first reference point has a first distance to the first rim along the axial line. The second reference point has a second distance to the first rim along the axial line. The second distance is larger than the first distance. The light collecting portion has a second abutting surface. The second abutting surface is away from the device body and has a third distance to the device body along the axial line. The first distance is equal to the third distance.

In one or more embodiments of the present disclosure, the color analyzing device further includes a support member. The support member is connected with the device body. The support member is configured to support the color analyzing device and adjust a height and a facing angle of the device body.

A technical aspect of the present disclosure is to provide an optical measurement adapter, which can allow a color analyzing device to collect light emitted from a screen in a certain measurement angle in a simple and easy manner for subsequent analysis.

According to an embodiment of the present disclosure, an optical measurement adapter includes a main body and light-absorbing layer. The main body is in a tubular shape. The main body has a first rim and a second rim opposite to the first rim. The first rim defines a plane and a first opening. The second rim defines a second opening communicated with the first opening. The second opening is configured for a color analyzing device to at least partially fit into. The plane is inclined to an extension direction of the main body.

The first rim being configured to abut against a device under test (DUT). The light-absorbing layer is coated on an inner wall of the main body.

In one or more embodiments of the present disclosure, the optical measurement adapter further includes a plurality of pads. The pads are respectively connected at an inner wall of the main body. The pads are configured to surround and press against the color analyzing device.

In one or more embodiments of the present disclosure, a material of the main body is polyvinylchloride (PVC).

In one or more embodiments of the present disclosure, the main body is manufactured from a 3-directional (3D) printer.

In one or more embodiments of the present disclosure, the plane is inclined by a measurement angle relative to the extension direction of the main body. A range of the measurement angle is between 5 degrees and 60 degrees.

A technical aspect of the present disclosure is to provide a method of optical measurement, which can collect light emitted from a screen in a certain measurement angle in a simple and easy manner for subsequent analysis.

According to an embodiment of the present disclosure, the method of optical measurement includes: selecting an abutting member according to an optical measurement requirement, the abutting member being in a tubular shape and extending along a longitudinal axis, an end of the abutting member along the longitudinal axis having an abutting surface, the abutting surface being inclined by a measurement angle relative to the longitudinal axis, the measurement angle fulfilling the optical measurement requirement; installing the abutting member on a color analyzing device along an axial line, such that the abutting surface is away from the color analyzing device; abutting the abutting surface to a position to be measured on a display screen of a device under test (DUT) according to the optical measurement requirement; and measuring and analyzing by the color analyzing device a light passing through the abutting member as emitted from the position to be measured.

In one or more embodiments of the present disclosure, the optical measurement requirement includes analyzing at least one of a chromaticity, a brightness and a color temperature of the light at the measurement angle. A range of the measurement angle is between 5 degrees and 60 degrees.

In one or more embodiments of the present disclosure, the method further includes: warming up the display screen; showing at least one positioning line on the display screen; adjusting a height and a facing angle of the color analyzing device, and aligning an auxiliary line of the abutting member to the positioning line in order to align the color analyzing device to the position to be measured; and rotating the abutting member relative to the color analyzing device before the abutting surface contacting with the display screen, such that the abutting surface fits to the display screen.

In one or more embodiments of the present disclosure, the auxiliary line is parallel with the longitudinal axis.

The above-mentioned embodiments of the present disclosure have at least the following advantages:

(1) Since the first abutting surface of the abutting member is inclined at a certain measurement angle relative to the axial line, the optical measurement apparatus is also inclined at the same measurement angle relative to the display screen during the optical measurement test. The abutting member can prevent the optical measurement apparatus from receiving the scattering or reflection of ambient light. The color analyzing device can easily and stably collect the light emitted from the display screen at the same measurement angle, which can be used for subsequent analysis.

(2) Before abutting the first abutting surface of the abutting member against the display screen, the user can merely rotate the abutting member relative to the color analyzing device to adjust the optical measurement apparatus to provide the desired measurement angle relative to the display screen, which is convenient to the user. When the display screen is a curved screen, the abutting member can also be rotated to better fit with the curvature of the position to be measured on the display screen.

BRIEF DESCRIPTION OF THE DRAWINGS

The disclosure can be more fully understood by reading the following detailed description of the embodiments, with reference made to the accompanying drawings as follows.

DETAILED DESCRIPTION

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
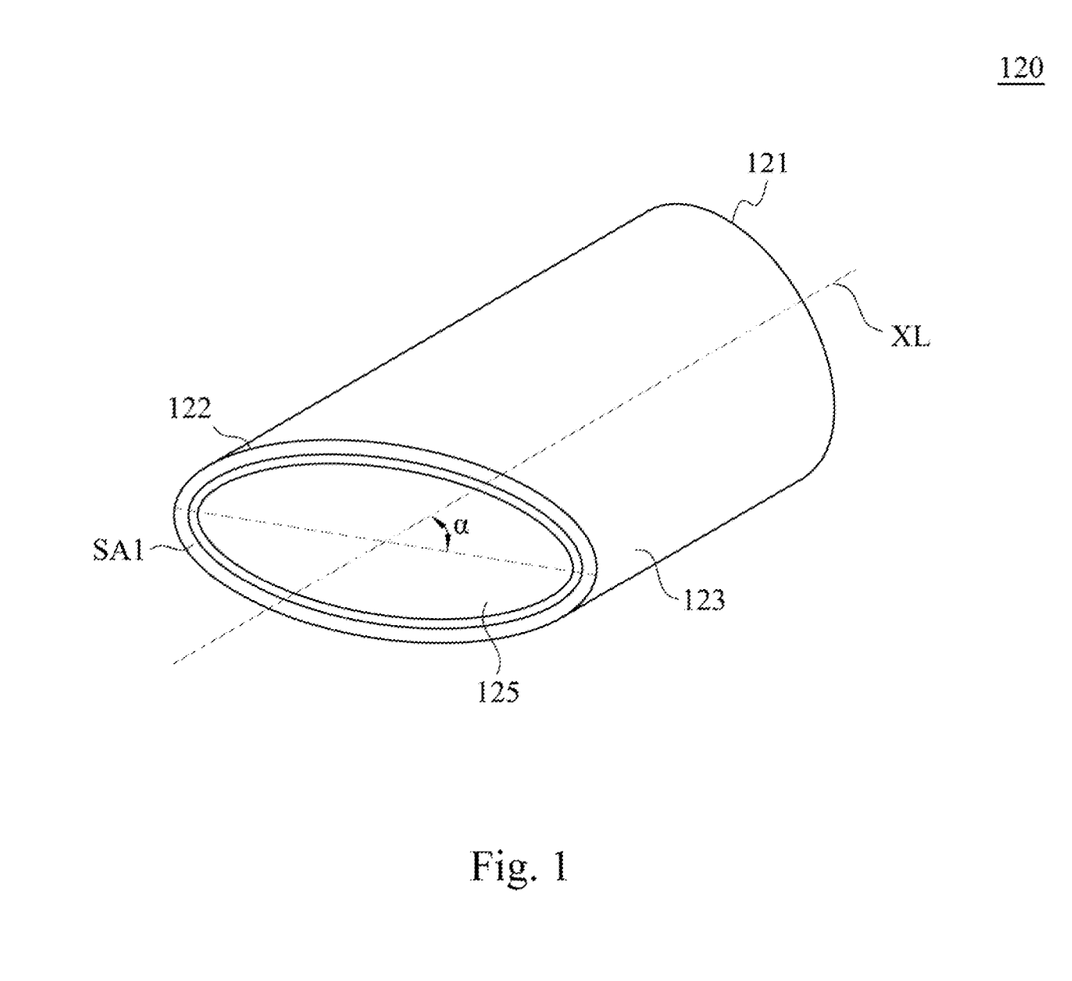
FIG. 1 is a schematic view of an abutting member according to an embodiment of the present disclosure.

Reference is made to FIG. 1. FIG. 1 is a schematic view of an abutting member 120 according to an embodiment of the present disclosure. In this embodiment, as shown in FIG.

1, the abutting member 120 is in a tubular shape and extends along an axial line XL, which is the longitudinal axis of the abutting member 120. The abutting member 120 has at its two ends a first rim 121 and a second rim 122 opposite to the first rim 121 along the axial line XL. The second rim 122 defines a first abutting surface SA1. Moreover, the first abutting surface SA1 defined by the second rim 122 is flat, and the first abutting surface SA1 is inclined by a measurement angle α relative to the axial line XL. For example, there could be a set of abutting members 120, which have the first abutting surface SA1 inclined by the measurement angles α in a range between 5 degrees and 60 degrees respectively. However, this does not intend to limit the present disclosure. In practical applications, a material of the abutting member 120 can include polyvinylchloride (PVC), or the abutting member 120 can be at least partially produced by a 3-directional (3D) printer.

Figure 2:
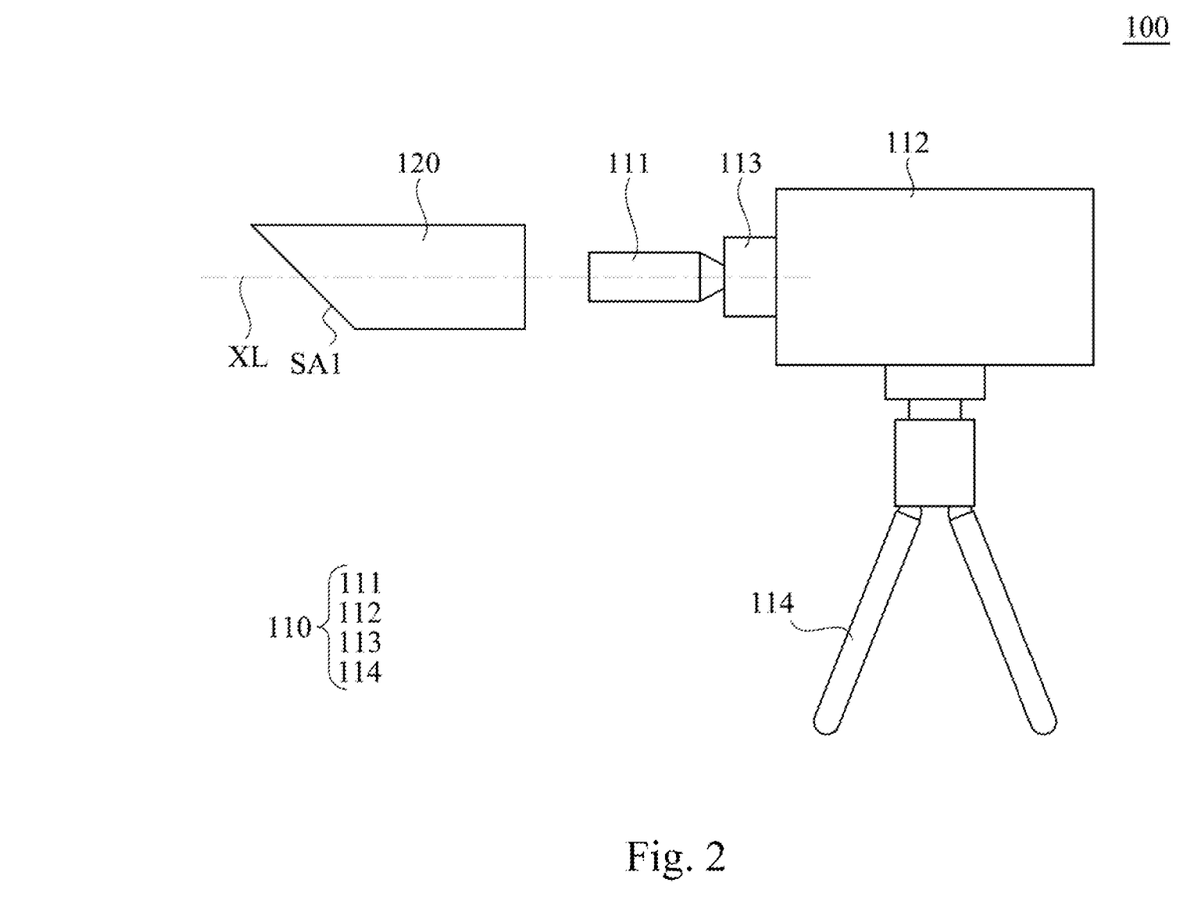
FIG. 2 is a side view of an optical measurement apparatus according to an embodiment of the present disclosure, in which the color analyzing device and the abutting member are separated from each other.
Figure 3:
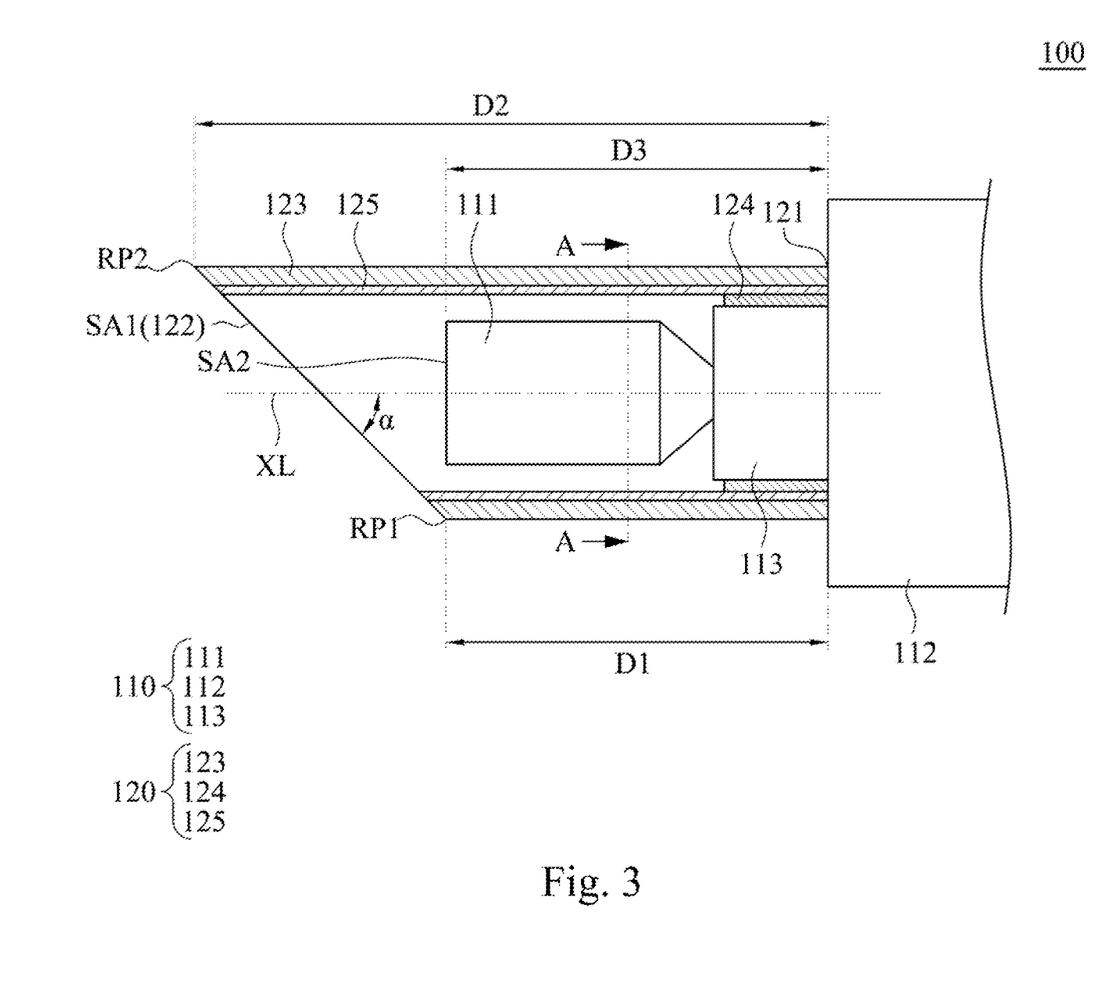
FIG. 3 is a partially-sectional view of the optical measurement apparatus of FIG. 2, in which the color analyzing device and the abutting member have been assembled.
Figure 6:
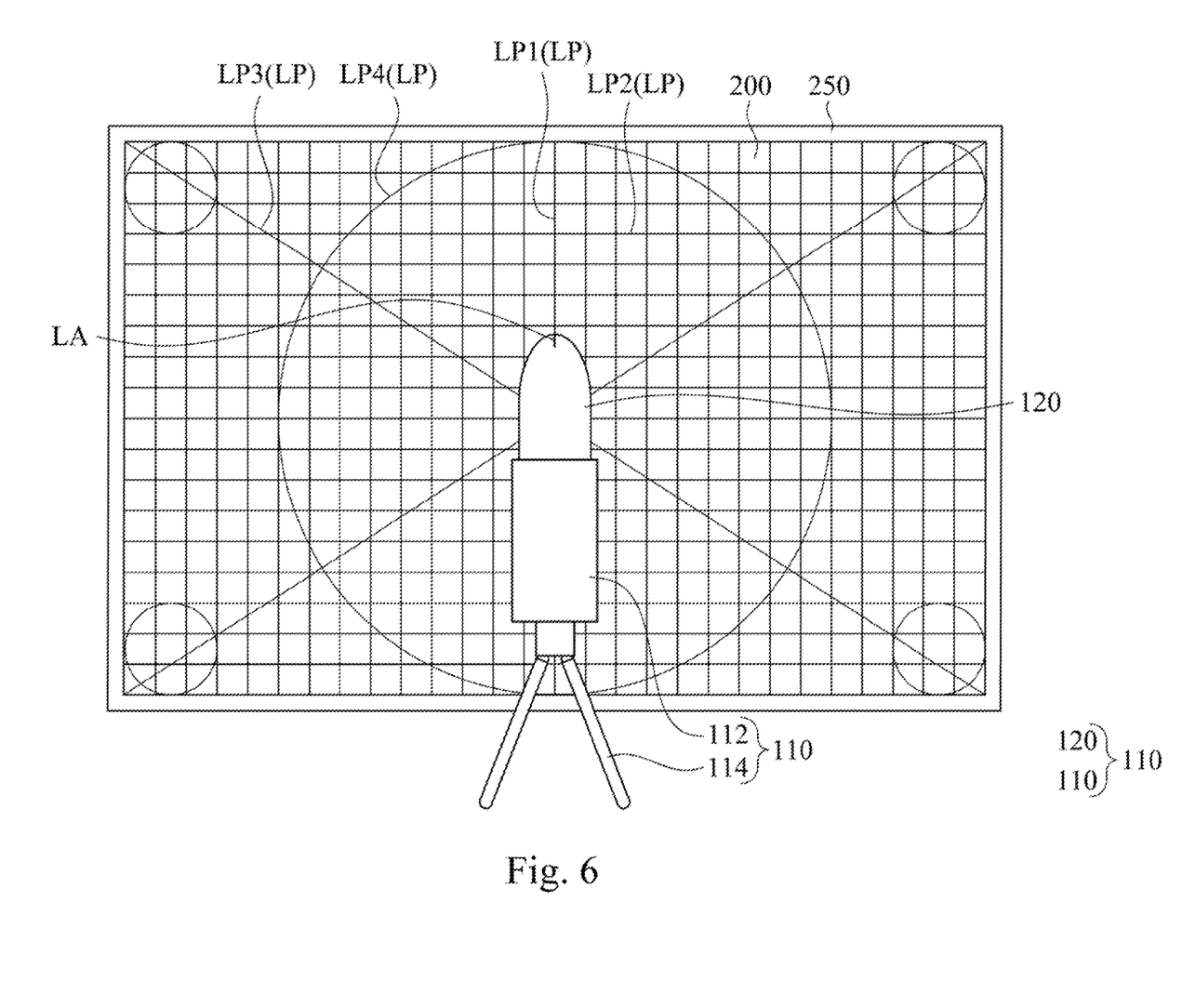
FIG. 6 is a front view of applying the optical measurement apparatus of FIGS. 2-3 in an optical measurement test.
Figure 7:
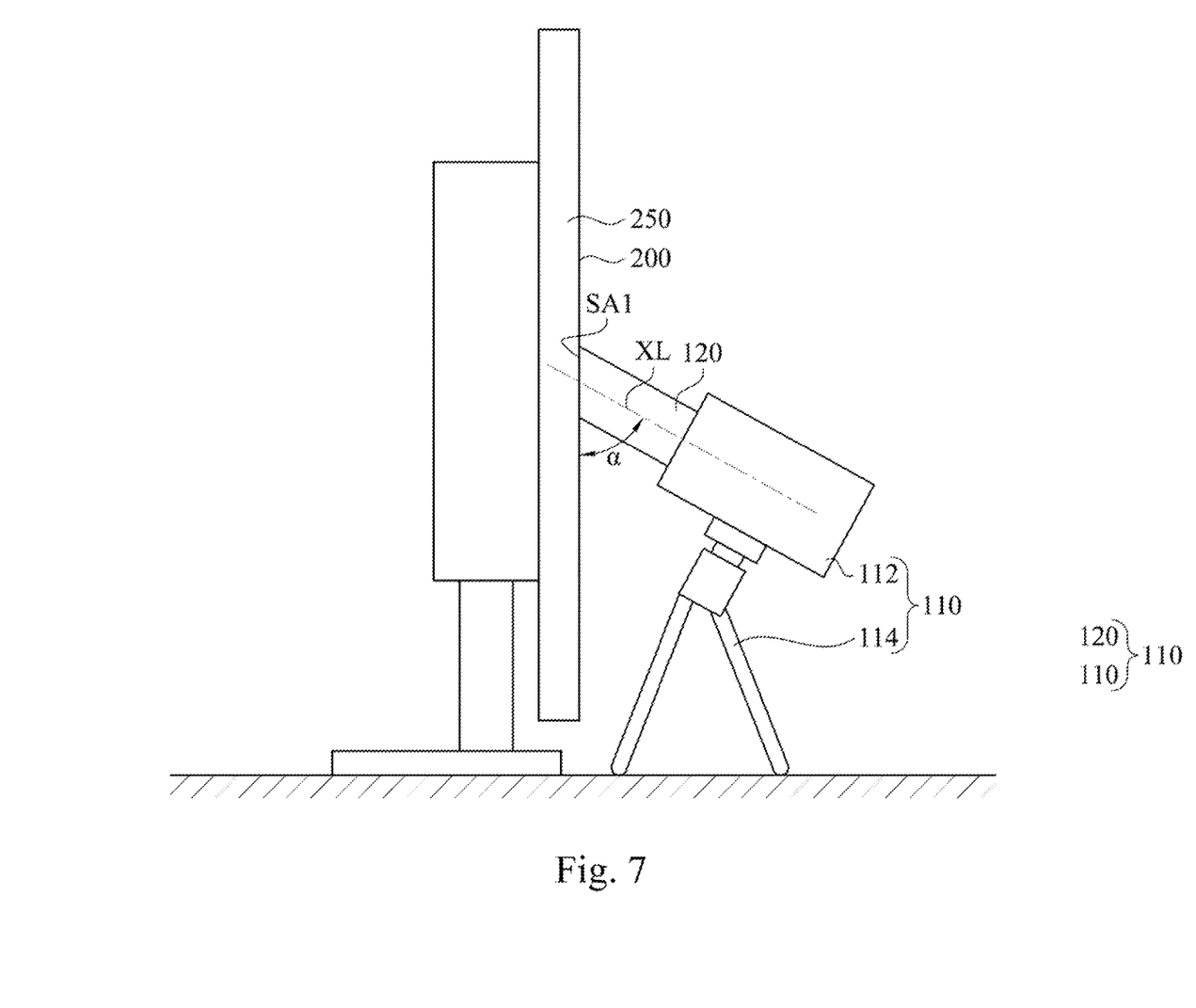
FIG. 7 is a side view of applying the optical measurement apparatus of FIG. 6 in an optical measurement test.
Figure 8:
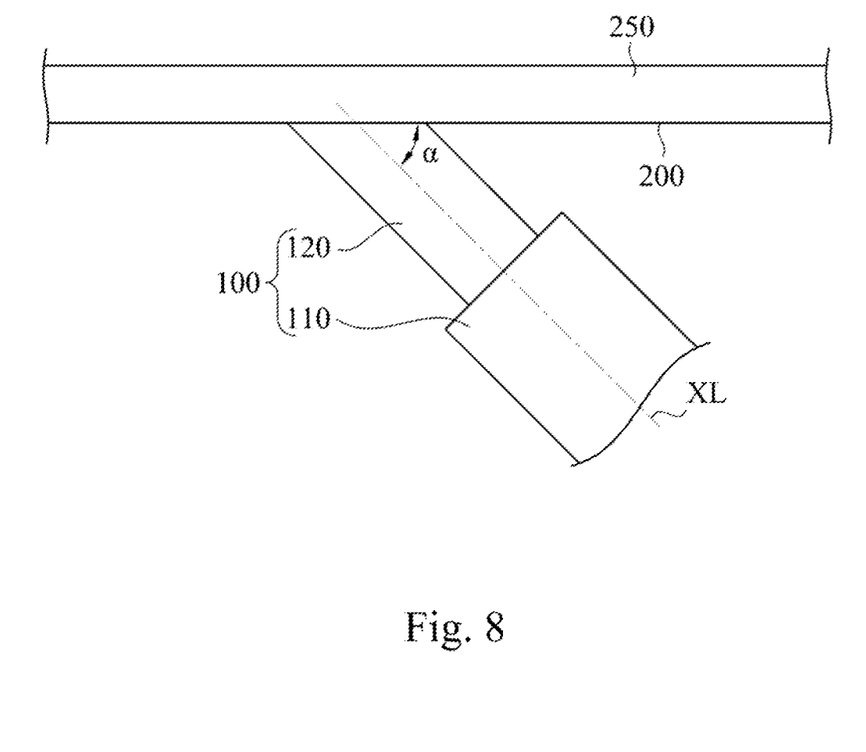
FIG. 8 is a top view of applying the optical measurement apparatus in an optical measurement test according to another embodiment of the present disclosure.

Reference is made to FIGS. 2-3. FIG. 2 is a side view of an optical measurement apparatus 100 according to an embodiment of the present disclosure, in which the color analyzing device 110 and the abutting member 120 are separated from each other. FIG. 3 is a partially-sectional view of the optical measurement apparatus 100 of FIG. 2, in which the color analyzing device 110 and the abutting member 120 have been assembled. In this embodiment, as shown in FIG. 2-3, the optical measurement apparatus 100 further includes a color analyzing device 110. The color analyzing device 110 includes a light collecting portion 111, a device body 112, a connecting portion 113 and a support member 114. The light collecting portion 111 is configured to face to a device under test (DUT) 200 and collect light emitted from the DUT 200. Please see FIGS. 6-8 for the DUT 200. Specifically, the DUT 200 can be a display screen 200 (as shown in FIGS. 6-8) of a display device 250, and the first abutting surface SA1 of the abutting member 120 is configured to abut against the DUT 200. The device body 112 is configured to measure and analyze the light emitted from the DUT 200. The connecting portion 113 is connected between the device body 112 and the light collecting portion 111 along the axial line XL. During the assembly of the optical measurement apparatus 100, the user inserts at least part of the connecting portion 113 of the color analyzing device 110 through the first rim 121 of the abutting member 120 along the axial line XL, which enters into the abutting member 120, presses against the connecting portion 113 and is connected with the inner wall of the abutting member 120, such that the abutting member 120 is secured to the color analyzing device 110. Furthermore, the abutting member 120 is configured to be rotatable relative to the connecting portion 113. In addition, after the optical measurement apparatus 100 is assembled, the first rim 121 of the abutting member 120 at least partially abuts against the device body 112 of the color analyzing device 110. Moreover, an upper portion of the support member 114 is rotatably connected with the device body 112, such that the device body 112 is free to rotate vertically or horizontally and the facing angle of the light collecting portion 111 can be thereby adjusted. A lower portion of the support member 114 supports the color analyzing device 110 and allows free adjustments of the height of the device body 112.

Figure 4:
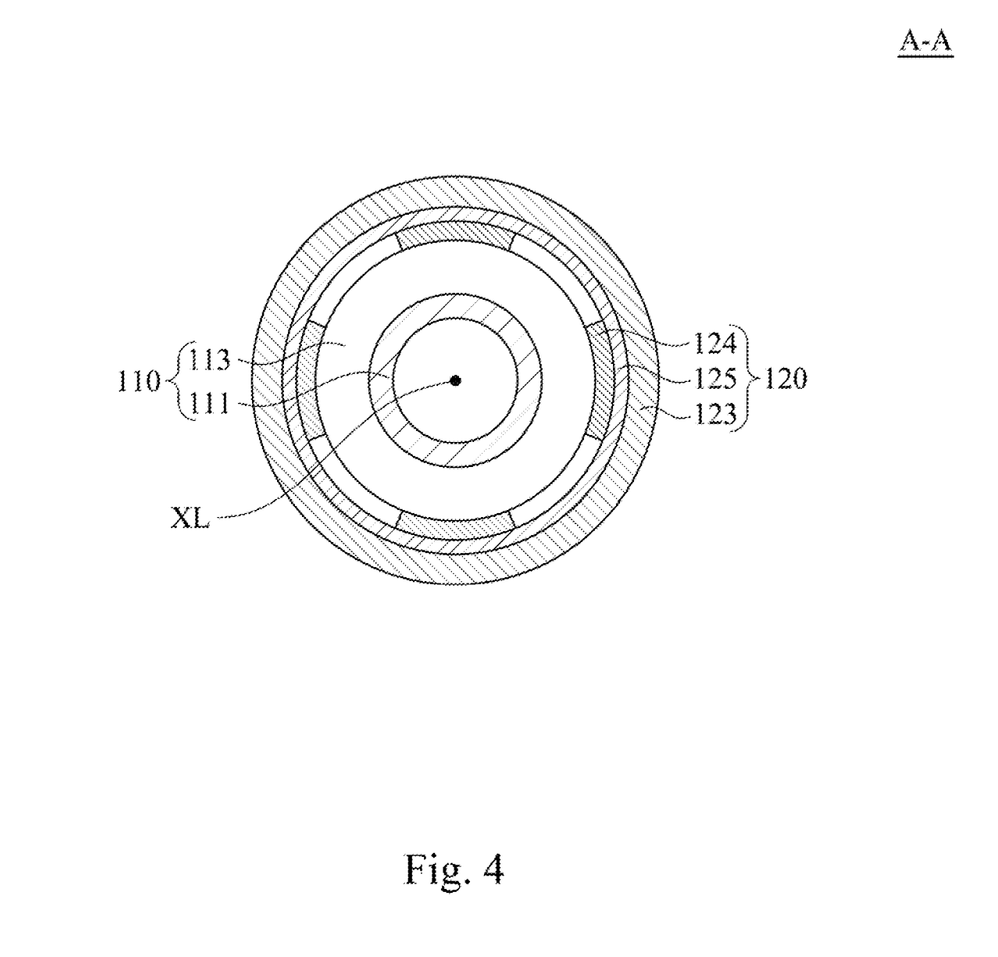
FIG. 4 is a cross-sectional view along the sectional line A-A in FIG. 3.

Reference is made to FIGS. 1 and 3-4. FIG. 4 is a cross-sectional view along the sectional line A-A in FIG. 3. In some of the embodiments, as shown in FIGS. 1 and 3-4, the abutting member 120 includes a main body 123 and a light-absorbing layer 125. The main body 123 is in a tubular shape and extends along the axial line XL. The main body 123 has at its two ends the aforementioned first rim 121 and the aforementioned second rim 122 along the axial line XL. The light-absorbing layer 125 is coated on, painted on or attached to the inner wall of the main body 123, and is configured to reduce interference and reflection of scattered light. In practical applications, the light-absorbing layer 125 is formed from black light-absorbing material coated on, painted on, or otherwise attached to the inner wall of the main body 123.

Moreover, as shown in FIGS. 3-4, the abutting member 120 further includes a plurality of pads 124. The pads 124 are respectively attached to the inner wall of the main body 123. The pads 124 are configured to surround and connect the connecting portion 113 of the color analyzing device 110. In practical applications, the pads 124 have certain elasticity to secure the connecting portion 113 and the abutting member 120 in a mutually interfering manner, thereby enhancing the stability of connection between them. In some embodiments, the pads 124 allow the abutting member 120 to be secured to any connecting portion 113 or color analyzing device 110 with similar size and shape, such that the applicability of the abutting member 120 is increased. Moreover, the pads 124 of the abutting member 120 are slidable relative to the connecting portion 113 of the color analyzing device 110, thus the abutting member 120 is rotatable relative to the color analyzing device 110, which changes the direction of the inclined first abutting surface SA1. In some embodiments, the abutting member 120 can have alternative connecting structures instead of the pads 124, or the connecting portion 113 of the color analyzing device 110 can have other pads or connecting structures to interfere with the abutting member 120. In addition, both the abutting member 120 and the connecting portion 113 can have corresponding connecting structures respectively. However, these do not intend to limit the present disclosure.

In some embodiments, as shown in FIGS. 3 and 4, the diameter of the connecting portion 113 is larger than the light collecting portion 111. As shown in FIG. 3, the vertical projection of the light collecting portion 111 towards the device body 112 completely overlaps on the connecting portion 113. In this way, after the abutting member 120 is installed on the color analyzing device 110, there exists a gap between the light collecting portion 111 and the abutting member 120. This means the abutting member 120 and the light collecting portion 111 maintain a distance therebetween to not contact with each other. However, this does not intend to limit the present disclosure.

On the other hand, as shown in FIG. 3, the abutting member 120 has a first reference point RP1 and a second reference point RP2 opposite to the first reference point RP1. The first reference point RP1 and the second reference point RP2 are respectively located at the rearmost end and the foremost end of the second rim 122 and are arranged at the measurement angle α relative to the axial line XL. Specifically, the first reference point RP1 has a first distance D1 to the first rim 121 along the axial line XL. The second reference point RP2 has a second distance D2 to the first rim 121 along the axial line XL. The second distance D2 is larger than the first distance D1. Moreover, the light collecting portion 111 has a second abutting surface SA2. The second abutting surface SA2 is away from the device body 112 and has a third distance D3 to the device body 112 along the axial line XL. In this embodiment, the first distance D1 is substantially equal to the third distance D3. In this way, the second abutting surface SA2 can approach the DUT 200 at a specific measurement angle α to the greatest extent, such that the measurement accuracy of the optical measurement apparatus 100 can be improved.

In practical situations, when a user intends to measure the DUT 200 with the color analyzing device 110 in the opposite direction, the user can remove the abutting member 120 from the color analyzing device 110, such that the second abutting surface SA2 of the light collecting portion 111 can face perpendicularly to and abut against the DUT 200.

Figure 5:
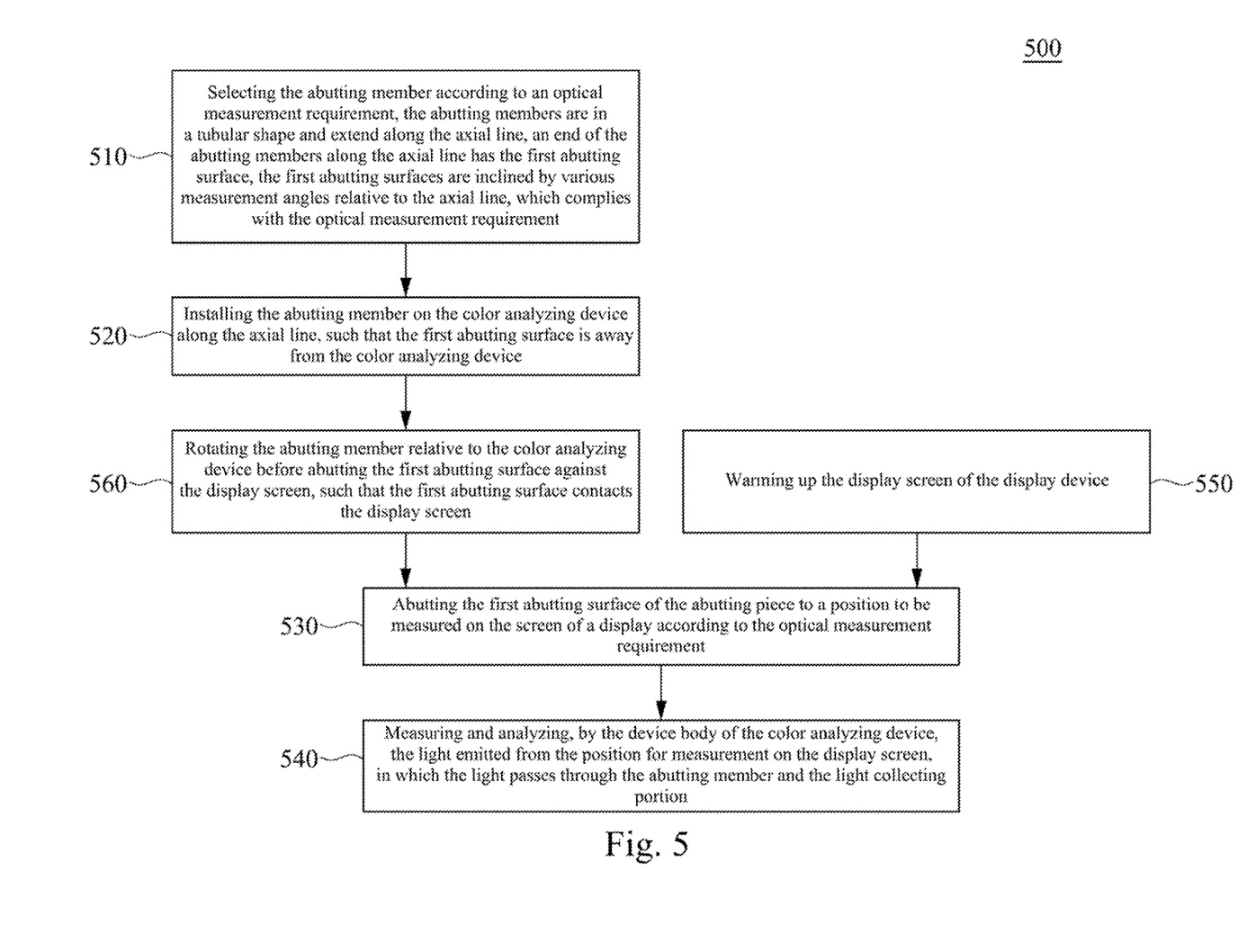
FIG. 5 is a flowchart of an optical measurement method according to an embodiment of the present disclosure.

Reference is made to FIG. 5. FIG. 5 is a flowchart of an optical measurement method 500 according to an embodiment of the present disclosure. In this embodiment, as shown in FIG. 5, the optical measurement method 500 includes the following steps, which should be understood that the order of steps mentioned below can be changed as per actual requirements, and some of the steps may be executed simultaneously or partially simultaneously unless their sequence is explicitly stated:

(1) Step 510: Selecting the abutting member 120 according to an optical measurement requirement. As mentioned above, the abutting members 120 are in a tubular shape and extend along the axial line XL, which is practically the longitudinal axis of the abutting members 120. An end of the abutting members 120 along the axial line XL has the first abutting surface SA1. The first abutting surfaces SA1 of the abutting members 120 are inclined by various measurement angles α relative to the axial line XL, which should be selected to comply with the optical measurement requirement.

(2) Step 520: Installing the abutting member 120 on the color analyzing device 110 along the axial line XL, such that the first abutting surface SA1 is away from the color analyzing device 110. With reference to the descriptions above, as shown in FIGS. 2-3, the connecting portion 113 of the color analyzing device 110 is at least partially inserted, through the first rim 121, into the abutting member 120 along the axial line XL, and the connecting portion 113 is pressed to connect the inner wall of the abutting member 120, such that the abutting member 120 is secured to the color analyzing device 110. In some embodiments, the abutting members 120 have the first abutting surfaces SA1 inclined at a measurement angle α relative to the axial line XL in the range between 5 degrees and 60 degrees respectively, users can install the selected abutting member 120 with an appropriate measurement angle α on the color analysis device 110 according to the desired viewing angle for measuring optical data of the DUT 200. For example, the measurement angle α or the desired viewing angle can be 5 degrees, 10 degrees, 15 degrees, 20 degrees, 25 degrees, 30 degrees, 35 degrees, 40 degrees, 45 degrees, 50 degrees, 55 degrees or 60 degrees.

(3) Step 530: Abutting the first abutting surface SA1 of the abutting member 120 to a position for measurement on the display screen 200 of a display device 250 according to the aforementioned optical measurement requirements. Reference is made to FIGS. 6-7. FIG. 6 is a front view of applying the optical measurement apparatus 100 of FIGS. 2-3 in an optical measurement test. FIG. 7 is a side view of applying the optical measurement apparatus 100 of FIG. 6 in an optical measurement test. In some embodiments, as shown in FIGS. 6-7, after the optical measurement apparatus 100 is assembled, the user can abut the first abutting surface SA1 of the abutting member 120 against the display screen 200 of a display device 250, which is the DUT. In some embodiments, the user can adjust the height and the position of the support member 114, such that the abutting member 120 can be abutted against a specific position of the display screen 200, such as the center, the edges, the corners, etc., so as to measure the optical data from the specific position of the display screen 200. Since the first abutting surface SA1 of the abutting member 120 is inclined at the measurement angle α relative to the axial line XL, the optical measurement apparatus 100 is also inclined at the measurement angle α relative to the display screen 200. Moreover, the abutting member 120 can prevent the optical measurement apparatus 100 from receiving the scattering or reflection of ambient light, and the color analyzing device 110 can easily and stably collect the light emitted from the display screen 200 at the measurement angle α, which can be used for subsequent analysis. For example, as shown in FIGS. 6-7, the optical measurement apparatus 100, inclined at the measurement angle α from bottom to top, abuts against the DUT 200 for optical measurement. The inclination of the optical measurement apparatus 100 can be adjusted to be from top to bottom, from left to right, or other directions.

(4) Step 540: Measuring and analyzing, by the device body 112 of the color analyzing device 110, the light emitted from the position for measurement on the display screen 200, wherein the light passes through the abutting member 120 and the light collecting portion 111. To be more precise, the step of analyzing the light includes analyzing at least one of the chromaticity, brightness and color temperature of the light. As mentioned above, the light-absorbing layer 125 is coated on the inner wall of the main body 123 of the abutting member 120, thus the abutting member 120 can reduce interference and reflection caused by the scattered light, which can increase the accuracy of analysis.

(5) Step 550: Warming up the display screen 200 of the display device 250. Specifically, before abutting the abutting member 120 against the display screen 200 of the display device 250, the user can turn on the display device 250 firstly to warm up, for example, the user can turn on the display screen 200 of the display device 250 with a fully white screen and set it at the highest brightness for 30 minutes continuously. Therefore, the display screen 200 can reach an appropriate working temperature and the measurement and analysis will be more accurate.

(6) Step 560: Rotating the abutting member 120 relative to the color analyzing device 110 before abutting the first abutting surface SA1 against the display screen 200, such that the first abutting surface SA1 contacts the display screen 200. As mentioned above, the abutting member 120 is rotatable relative to the color analyzing device 110. Thus, before abutting the first abutting surface SA1 against the display screen 200, the user can rotate the abutting member 120 firstly relative to the color analyzing device 110 to adjust the inclination direction of the first abutting surface SA1. In this way, the optical measurement apparatus 100 can be fixed at a measurement angle α and in the desired viewing direction for measurement relative to the display screen 200. Because the user is only required to rotate the abutting member 120 relative to the color analyzing device 110 in order to adjust the optical measurement apparatus 100 to the desired measurement angle α relative to the display screen 200, it facilitates ease and convenience to the user in optical measurement. In addition, when the display screen 200 is a curved screen, the abutting member 120 can also be rotated to better fit with the curvature of the position to be measured on the curved screen.

In addition, reference is made to FIG. 6. In some of the embodiments, as shown in FIG. 6, at least one positioning line LP can be displayed on the display screen 200 in order to improve the measurement accuracy. For example, the positioning lines LP can include a plurality of vertical lines LP1, horizontal lines LP2, inclined lines LP3 or curved lines LP 4 as shown in FIG. 6. Correspondingly, an auxiliary line LA can be drawn or disposed on the outer wall of the abutting member 120. When the user abuts the first abutting surface SA1 of the abutting member 120 against the display screen 200 of the display device 250, the user can adjust the height and the orientation of the color analyzing device 110 and align the auxiliary line LA of the abutting member 120 to a positioning line LP displayed on the display screen 200, thereby aligning the color analyzing device 110 to the position for measurement on the display screen 200, so as to improve the measurement accuracy. For example, as shown in FIG. 6, the auxiliary line LA of the abutting member 120 is aligned to one of the vertical lines LP1 displayed on the display screen 200.

Reference is made to FIG. 8. FIG. 8 is a top view of applying the optical measurement apparatus 100 in an optical measurement test according to another embodiment of the present disclosure. According to the actual situations, the abutting member 120 can be rotated relative to the color analyzing device 110, such that the optical measurement apparatus 100 can abut against the display screen 200 with different orientations. For example, as shown in FIG. 8, the optical measurement apparatus 100 abuts against a horizontal surface of the display screen 200, and is inclined by the measurement angle α relative to the display screen 200.

In summary, the aforementioned embodiments of the present disclosure have at least the following advantages:
(1) Since the first abutting surface of the abutting member is inclined at a certain measurement angle relative to the axial line, the optical measurement apparatus is also inclined at the same measurement angle relative to the display screen during the optical measurement test. The abutting member can prevent the optical measurement apparatus from receiving the scattering or reflection of ambient light. The color analyzing device can easily and stably collect the light emitted from the display screen at the same measurement angle, which can be used for subsequent analysis.
(2) Before abutting the first abutting surface of the abutting member against the display screen, the user can merely rotate the abutting member relative to the color analyzing device to adjust the optical measurement apparatus to provide the desired measurement angle relative to the display screen, which is convenient to the user. When the display screen is a curved screen, the abutting member can also be rotated to better fit with the curvature of the position to be measured on the display screen.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An optical measurement apparatus, comprising:
    a color analyzing device, comprising:
        a light collecting portion configured to face to a device under test (DUT) and collect a light emitted from the DUT;
        a device body configured to measure and analyze the light; and
        a connecting portion connected between the device body and the light collecting portion along an axial line; and
    an abutting member being in a tubular shape and extending along the axial line, the abutting member having a first rim and a second rim opposite to the first rim along the axial line,
    wherein the connecting portion at least partially penetrates through the first rim and connects with an inner wall of the abutting member, the second rim defines a first abutting surface, the first abutting surface is inclined by a measurement angle relative to the axial line and is configured to abut against the DUT.

2. The optical measurement apparatus of claim 1, wherein a range of the measurement angle is between 5 degrees and 60 degrees.

3. The optical measurement apparatus of claim 1, wherein the first abutting surface is a flat surface, the abutting member is configured to be rotatable relative to the connecting portion, and the first rim at least partially abuts against the device body.

4. The optical measurement apparatus of claim 1, wherein the abutting member comprises:
    a main body being in a tubular shape and extending along the axial line, the main body having the first rim and the second rim; and
    a plurality of pads respectively connected at an inner wall of the main body, the pads are configured to surround and connect with the connecting portion.

5. The optical measurement apparatus of claim 4, wherein a material of the main body is polyvinylchloride (PVC).

6. The optical measurement apparatus of claim 4, wherein the main body is manufactured from a 3-directional (3D) printer.

7. The optical measurement apparatus of claim 1, wherein the abutting member comprises:
    a main body being in a tubular shape and extending along the axial line, the main body having the first rim and the second rim; and
    a light-absorbing layer coated on an inner wall of the main body.

8. The optical measurement apparatus of claim 1, wherein the abutting member has a first reference point and a second reference point opposite to the first reference point, the first reference point and the second reference point are respectively located at the second rim and arranged at the measurement angle relative to the axial line, the first reference point has a first distance to the first rim along the axial line, the second reference point has a second distance to the first rim along the axial line, the second distance is larger than the first distance, the light collecting portion has a second abutting surface, the second abutting surface is away from the device body and has a third distance to the device body along the axial line, the first distance is equal to the third distance.

9. The optical measurement apparatus of claim 1, wherein the color analyzing device further comprises:

a support member connected with the device body, the support member is configured to support the color analyzing device and adjust a height and a facing angle of the device body.

10. An optical measurement adapter, comprising:
a main body being in a tubular shape, the main body having a first rim and a second rim opposite to the first rim, the first rim defining a plane and a first opening, the second rim defining a second opening communicated with the first opening, the second opening being configured for a color analyzing device to at least partially fit into, the plane being inclined to an extension direction of the main body, the first rim being configured to abut against a device under test (DUT); and
a light-absorbing layer coated on an inner wall of the main body.

11. The optical measurement adapter of claim 10, further comprising:
a plurality of pads respectively connected at an inner wall of the main body, the pads being configured to surround and press against the color analyzing device.

12. The optical measurement adapter of claim 10, wherein a material of the main body is polyvinylchloride (PVC).

13. The optical measurement adapter of claim 10, wherein the main body is manufactured from a 3-directional (3D) printer.

14. The optical measurement adapter of claim 10, wherein the plane is inclined by a measurement angle relative to the extension direction of the main body, a range of the measurement angle is between 5 degrees and 60 degrees.

15. A method of optical measurement, comprising:
selecting an abutting member according to an optical measurement requirement, the abutting member being in a tubular shape and extending along a longitudinal axis, an end of the abutting member along the longitudinal axis having an abutting surface, the abutting surface being inclined by a measurement angle relative to the longitudinal axis, the measurement angle fulfilling the optical measurement requirement;
installing the abutting member on a color analyzing device along an axial line, such that the abutting surface is away from the color analyzing device;
abutting the abutting surface to a position to be measured on a display screen of a device under test (DUT) according to the optical measurement requirement; and
measuring and analyzing by the color analyzing device a light passing through the abutting member as emitted from the position to be measured.

16. The method of claim 15, wherein the optical measurement requirement comprises analyzing at least one of a chromaticity, a brightness and a color temperature of the light at the measurement angle, wherein a range of the measurement angle is between 5 degrees and 60 degrees.

17. The method of claim 15, further comprising:
warming up the display screen;
showing at least one positioning line on the display screen;
adjusting a height and a facing angle of the color analyzing device, and aligning an auxiliary line of the abutting member to the positioning line in order to align the color analyzing device to the position to be measured; and
rotating the abutting member relative to the color analyzing device before the abutting surface contacting with the display screen, such that the abutting surface fits to the display screen.

18. The method of claim 17, wherein the auxiliary line is parallel with the longitudinal axis.

* * * * *